United States Patent [19]
de Carbon

[11] 3,785,423
[45] Jan. 15, 1974

[54] TOP REINFORCEMENT FOR PNEUMATIC TIRES

[76] Inventor: Christian M. L. L. Bourcier de Carbon, 64, boulevard Maurice Barres 92, Neuilly, France

[22] Filed: Dec. 15, 1971

[21] Appl. No.: 208,316

[52] U.S. Cl. .......................................... 152/361 R
[51] Int. Cl. ............................................. B60c 9/18
[58] Field of Search ................ 152/361, 359, 361 R

[56] References Cited
UNITED STATES PATENTS

| | | | |
|---|---|---|---|
| 3,083,749 | 4/1963 | Destinay et al. ................ | 152/361 R |
| 2,423,995 | 7/1947 | Reynolds ............................ | 152/359 |
| 1,201,257 | 10/1916 | Cobb ................................. | 152/361 R |
| 3,720,569 | 3/1973 | Kimble ............................. | 152/361 R |
| 3,720,570 | 3/1973 | Greene et al. .................... | 152/361 R |

Primary Examiner—Gerald M. Forlenza
Assistant Examiner—George H. Libman
Attorney—Watson, Cole, Grindle & Watson

[57] ABSTRACT

Between the tread of the tire and the body of the tire, whether of the bias filament or radial filament carcass, or having no filamentary carcass, there is embedded a reinforcement band of crossed series of flat parallel elements of metal, plastic, or the like, the angles of intersection of the series being at least 45°, and the elements of each series having a high intrinsic resistance to curvature in the plane of the contact surface. The elements being of a thickness of only a fraction of their width, say a width of the order of a millimeter and a thickness of only a fraction of a millimeter. The interstices and points of intersection of the elements being filled with a rubber composition of relatively low modulus of elasticity. Alternatively, instead of being of metal, plastic, glass fibre, or the like, the bands may be composed of impregnated stranded elements embedded in a rubber having a high modulus of elasticity.

1 Claim, 3 Drawing Figures

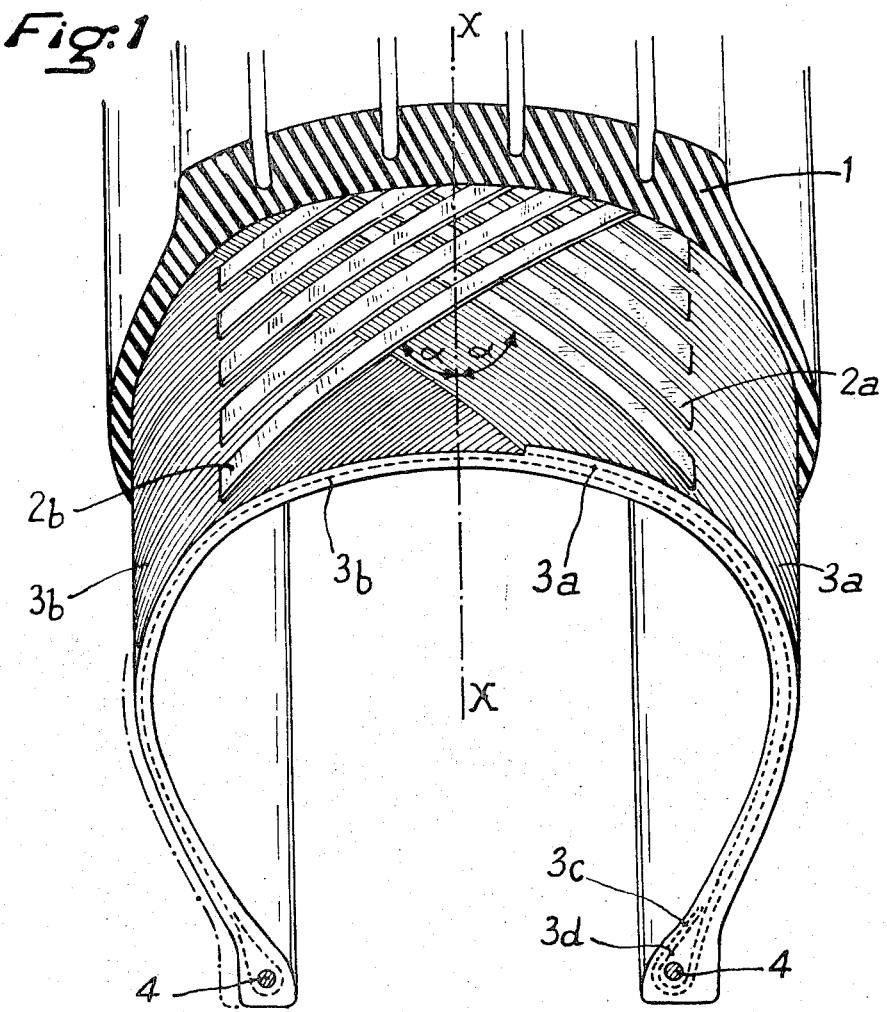

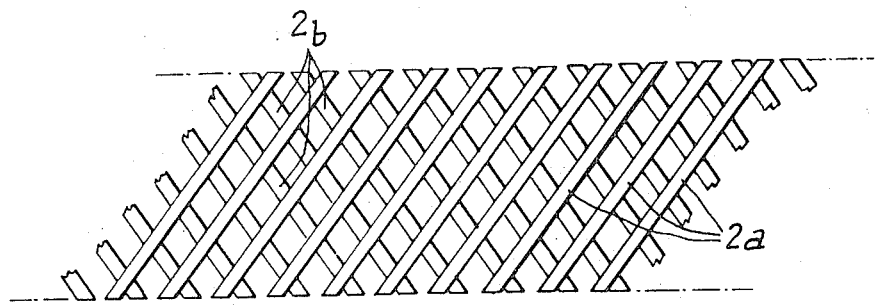
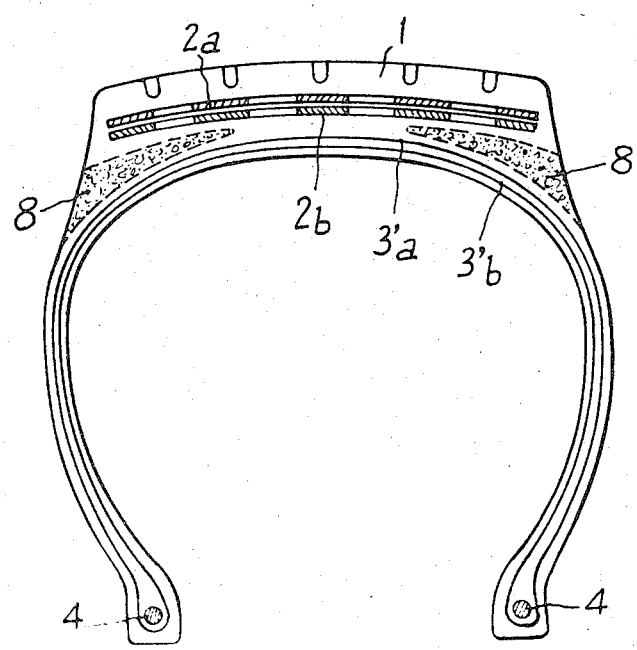

TOP REINFORCEMENT FOR PNEUMATIC TIRES

The considerable success of "radial carcass" or "belted" pneumatic tires is due to the following two qualities:

1. Their small drift, which gives them good steering and excellent holding power, resulting in more pleasant and safer fast driving, and
2. Their low tread resistance, resulting in longer working life and saving in petrol.

Conventional diagonal-carcass pneumatic tires do not have these qualites, for reasons which will be explained hereinafter.

Radial-carcass tires essentially comprise a radial carcass made up of curved members which are straight in the center planes of the cover, in combination with a non-extensible belt comprising a reinforcement which is flexible in the radial direction (the direction perpendicular to the tread surface) but has high longitudinal and transverse rigidity (i.e., in directions parallel to the tread surface), the non-extensible belt being automatically tensioned by the internal pressure and thus having a considerable equatorial binding effect on the curved members of the carcass, even when the pneumatic tire is at rest and is not subjected to any crushing load.

Unfortunately, the advantages of the aforementioned tires are accompanied by a serious fault which does not occur in conventional diagonal-carcass tires - i.e., driving is particularly rough with radial-carcass tires, as is shown inter alia by an increase in longitudinal vibration in the suspension elements, the vibration occurring in the frequency bands of between 50 and 200 cycles.

A study of the aforementioned disturbances in running has led the applicant to the conclusion that the longitudinal vibration is substantially due to the longitudinal rigidity of the pneumatic tyre belt, and that the problem is to find a belt which is not rigid longitudinally, i.e., which is extensible in the longitudinal direction, but which is very rigid laterally so as to give good steering power - the main quality of the belted radial pneumatic tire. By a combination of circumstances, it has been found that the method proposed by the inventor produces a tread resistance which is very low and comparable with that of conventional belted pneumatic radial tires.

The invention therefore aims to provide a novel kind of belt or top reinforcement adapted to combine the at present incompatible advantages of the belted radial tire and of the conventional diagonal-carcass tire, while avoiding the faults of each of them.

In the case of diagonal-carcass pneumatic tires, the lateral forces causing drift deform the cardioid "contact ellipse," causing the rear of the ellipse to slide on the ground and consequently wearing the rubber tread. This phenomenon, which is important during rapid turning, is one of the main causes of wear on diagonal-carcass pneumatic tires. Clearly, it does not occur with the rigid belt of conventional belted radial pneumatic tires.

Usually, the non-deformable belt of conventional belted radial pneumatic tires is made up filaments or stranded elements disposed at a very small angle to the equatorial plane of the cover and symmetrically with respect to the cover. As an alternative method, some inventors have tried placing longitudinal filaments or cables in the center region of the top and placing oblique cables intersecting at a large angle on each side of the longitudinal filaments or cables. As already mentioned, however, in Michelin French Pat. No. 1,166,794, this gives nothing like the dsired effect, since, though a pneumatic tire of the aforementioned kind is non-deformable longitudinally and partially nondeformable transversely, it is easily subject to cardioid deformation, so that its hold on the road is weak and it becomes worn as a result of drift.

The reason is that, when the tread suffers cardioid transverse deformation, the longitudinal filaments at the center of the deformed reinforcement are in what may be called the neutral fiber (i.e., neither stretched or compressed) of this sort of bent beam, whereas the lateral, non-triangulated lozenges can expand on one side and contract at the other, thus giving no protection against cardioid deformation, which needs to be avoided in order to improve the hold on the road and reduce wear from drift.

It can easily be seen that the same applies to a method, often called the mixed method, user inter alia in the U.S.A, in which an attempt is made to give diagonal-fold pneumatic tires the advantages of the belted radial tire by providing the top with an additional reinforcement comprising two sheets of filaments intersecting the equatorial plane at an angle of approximately 45°. Clearly, however, the aforementioned feature cannot eliminate cardioid deformation and consequently cannot eliminate drift, since the last-mentioned reinforcement, which is made up of non-triangulated flexible filaments, does not have any noteworthy rigidity in directions parallel to the tread surface and does not prevent the top reinforcement from curving in the plane of the tread surface.

It is clear from the foregoing analysis of the mechanism of cardioid deformation that the projection on the ground of each of the oblique, initially straight filaments or cables inevitably curves to a certain extent in the horizontal plane.

In order to avoid the aforementioned cardioid deformation, in accordance with the main aim of the invention, it is proposed that the top fitting should comprise two oblique sheets, or two groups of oblique sheets, symmetrically disposed with respect to the equatorial plane, the elements in each sheet or group of sheets being parallel and having high intrinsic resistance to curvature in the plane of the contact surface. Accordingly, it is proposed that the oblique sheets should be made up of very flattened filaments having a thickness which is only a fraction of their width, or better by bands havin a width of up to several millimetres.

Accordingly, it is proposed to construct the top reinforcements of the pneumatic tire from elements made of metal, plastics or any other suitable material disposed so that the reinforcements are longitudinally extensible but are not transversely deformable. To this end, the top reinforcement comprises two sheets, or preferably two groups of sheets, made up of elements which are parallel in each group and symmetrically disposed with respect to the equatorial plane of the tire, the parallel elements having a substantially flat shape so as to have a large moment of inertia in the direction of their width compared with the moment of inertia in the direction of their thickness, the elements being assembled so as to form a large angle, preferably of at least 45°, with the equatorial plane of the pneumatic tire, the points of intersection of the flattened elements acting as a joint so that the assembly has a scissors or pantograph effect.

Accordingly, although the elements are radially flexible, they cannot bend in the plane of the contact surface, and the aforementioned reinforcement may be expected to provide a steering power which is considerably greater than that of conventional diagonal-carcass tires and perhaps even considerably greater than that of conventional radial-carcass tires.

The following are further features of the invention:

1 The points of intersection are connected by rubber secured to the facing surfaces of the flattened elements, the elasticity of the rubber acting as a joint.

2 The flattened elements are highly flattened filaments having a width of the order of a millimetre and a thickness of only a fraction of a millimetre.

3 The flattened elements are bands having a width of several millimetres or even of the order of one centimetre.

4 The flattened elements of a single sheet are spaced at a certain distance from one another and the interstices and at least part of the tread are filled with rubber having a relatively low modulus of elasticity.

5 The top reinforcement is prepared in advance in the form of a band comprising a sheet of flattend elements inclined in one direction, a sheet of rubber and a sheet of flattened elements inclined in the opposite direction with respect to the equatorial plane of the pneumatic tyre, the rubber sheet being secured to a or the aforementioned sheets of flattened elements by vulcanisation.

6 The top reinforcement is substantially flat.

7 The top reinforcement is combined with a diagonal carcass whose filaments are at substantially the same angle to one another as the flattened elements of the aforementioned top reinforcement.

12 The top reinforcement is combined with a radial carcass, the tread comprising the top reinforcement not being secured to the radial carcass except in the equatorial plane, and cavities can be provided on either side of the equatorial plane between the tread and the carcass, the cavities being filled if required with rubber having a very low modulus of elasticity, e.g., cellular rubber.

By way of example, and to facilitate understanding of the following description, the accompanying drawings show:

FIG. 1 - a diagrammatic perspective, partly cut-away view of a pneumatic tire according to the invention, FIG. 2, a diagrammatic top view of a reinforcement according to the invention, FIG. 3, a diagrammatic view in section of another embodiment of the pneumatic tire.

As FIG. 1 shows, the pneumatic tire comprises a carcass made up of diagonal filaments 3a, 3b whose ends 3c, 3d are bent around a bead rod 4. A top reinforcement is provided and comprises flattened elements in the form of intersecting steel strips or bands 2a, 2b disposed between the tread 1 and the diagonal carcass 3a, 3b. Since bands 2a, 2b have a width of several millimetres and a thickness of a fraction of a millimetre, their moment of inertia in the direction of their width is very large compared with the moment of inertia in the direction of their thickness. Since, according to another feature of the invention, the points of intersection of bands 2a, 2b are jointed together by providing a layer of rubber between the facing surfaces of the bands and securing the aforementioned surfaces by vulcanisation, the top reinforcement as a unit behaves like a pantograph which is extensible longitudinally but non-deformable transversely. As can be seen, bands 2a, 2b preferably include a large angle $\mu$ of at least 45° in the direction away from the equatorial plane of the pneumatic tire; the aforementioned angle, which is greater than 45° and preferably equal to approx. 60°, is substantially equal to the angle of the diagonal carcass 3a, and 3b. This avoids any triangulation of the reinforcements, so as to allow the desired longitudinal deformation of the top reinforcement although its transverse rigidity prevents any cardioid deformation of the tread 1. Since the bands 2a, 2b are spaced at a certain distance from one another, it is proposed to fill the interstices between the bands and embed the resulting top reinforcement in rubber having a relatively low modulus of elasticity, so that the top fitting has the desired deformability. Accordingly, at least part of the tread 1 is made of rubber having a low modulus of elasticity.

The cross-section of an aforementioned top reinforcement or "belt" may be slightly curved but is preferably very flat so that the belt has a substantially cylindrical barrel shape so as to help it to move along the ground with the minimum deformation and slipping and consequently with the minimum wear and resistance to forward movement owing to the pantograph or scissor effect of the aforementioned feature when the constituent elements have sufficient lateral rigidity.

The wear on a conventional diagonal-carcass pneumatic-tire cover is mainly due, apart from the aforementioned causes, to continuous slipping of the tread elements in contact with the road owing to the expansion and contraction of the aforementioned contact surface due to the deformation to which it is subjected when the tire travels on the ground. If the belt structure according to the invention is used, the contact surface still undergoes lateral expansion and longitudinal contraction as in the conventional diagonal-carcass pneumatic tire, but, owing to the pantograph or scissor effect of the rigidity of bands 2a, 2b in the horizontal plane, the aforementioned expansion of the contact surface and simultaneous longitudinal contraction extends into the entire region in front of and behind the contact surface, and may even extend all round the pneumatic tyre. Consequently, deformation has already occurred when the tire comes in contact with the ground, so that the drift of the contact surface is reduced to a negligible value, thus solving the problem of wear and tread resistance and simultaneously solving the problem of drift resistance.

Under the weight of the vehicle, which tends to widen the contact surface, the aforementioned pantograph mechanism has a binding effect tending to reduce the outer diameter of the pneumatic tire. The strength of this effect depends on the pressure of the ground on the contact ellipse. The aforementioned pressure depends only on the static load on the wheel when the vehicle is at rest, but varies with the irregularities in the road when the vehicle moves.

The consequence is extremely important. When the pneumatic tire meets a protruding obstacle tending to widen the contact surface, its outer diameter immediately tends to decrease, so that the obstacle is more easily crossed. Of course, the opposite consideration applies when crossing a hole in the road.

Accordingly, the pneumatic tire according to the invention behaves as if its radial dynamic flexibility during motion were greater than the measured flexibility when the tire is stationary, so that the tire is extremely comfortable.

These arguments, which are somewhat brief, are confirmed by a more detailed mathematical study of the vertical motion of the wheel in dependence on the pneumatic tire reactions on the ground.

Of course, the top reinforcement could be prepared in any other manner without departing from the invention. For example, the reinforcement can be made up of at least one pair of oblique surfaces having opposite inclinations, the surfaces being superposed and each surface comprising a number of bands of highly flattened filaments made of steel, plastics, glass fiber or any other appropriate material; the bands can be made of impregnated, stranded elements embedded in a rubber having a high modulus of elasticity. In the latter case, the flattened bands or filaments, which are parallel in a single sheet, are all inclined in the same direction, but the direction in one sheet is opposite to the direction in the other sheet. In this manner, the top reinforcements can be prepared in advance and a rubber sheet can be disposed between two sheets of filaments and can be secured by vulcanisation to the facing surfaces of the flattened bands or filaments, producing a connection which, owing to the elasticity of the rubber, forms a joint between the points of intersection of the aforementioned flattened bands or filaments.

A belt or top reinforcement of the aforementioned kind is ideal for giving diagonal-carcass pneumatic tires the advantages of existing belted radial-carcass pneumatic tires while avoiding the disadvantages.

Of course, in order to avoid any triangulation effect as aforementioned, the filaments or bands of the belt are advantageously disposed in the same directions as the filaments of the diagonal-filament carcass. Of course, the top reinforcement according to the invention can be associated with a radial carcass. Advantageously, however, in order to avoid the triangulation effect normally resulting from the aforementioned combination, the tread 1 and the top reinforcement comprising bands 2a, 2b (FIG. 3) should not be secured to the carcass except in the equatorial plane, by providing recesses 7 on each side of the aforementioned plane between the top reinforcement and the carcass. Depending on particular circumstances, the cavities may or may not be subsequently filled with a rubber having a very low modulus of elasticity, e.g., cellular rubber.

Of course, the features of the invention are not limited to the examples described but also apply to pneumatic tires not having a carcass; indeed the aforementioned method is essential in the case of the lastmentioned pneumatic tires.

I claim:

1. A diagonal carcass pneumatic tire the filaments of the carcass crossing each other and making an angle of from 45° to 60° with the equatorial plane of the tire, said tire comprising also a tread and a reinforcing member embedded in the tire structure between the carcass and the tread, said member consisting of a sheet of crossed series of parallel metallic elements, the angles of intersection of the elements of each series with said equatorial plane being between 45° and 60°, the same as the angularity of the carcass filaments, said elements having a high intriusic resistance to curvature in the plane of the contact surface; said elements being thin, the thickness thereof being only a fraction of their width, the width being in the range of several millimeters and the thicknesses of anly a fraction of a millimeter, whereby the moment of inertia in the direction of their width is very large compared with the moment of inertia in the direction of their thickness; the elements of the two series being joined together at their points of intersection by means of a layer of rubber having a relatively low modulus of elasticity; all whereby the reinforcing member are somewhat extensible longitudinally but resistant to transverse bending.

* * * * *